(12) United States Patent
Marple

(10) Patent No.: US 8,175,423 B2
(45) Date of Patent: May 8, 2012

(54) FILTERED FIBER OPTIC PROBE

(76) Inventor: Eric T. Marple, Loxahatchee, FL (US)

( * ) Notice: Subject to any disclaimer, the term of this patent is extended or adjusted under 35 U.S.C. 154(b) by 340 days.

(21) Appl. No.: 12/630,640

(22) Filed: Dec. 3, 2009

(65) Prior Publication Data

US 2011/0135244 A1    Jun. 9, 2011

(51) Int. Cl.
*G02B 6/00* (2006.01)
(52) U.S. Cl. .......................................... 385/12; 385/147
(58) Field of Classification Search ................... 385/12, 385/13
See application file for complete search history.

(56) References Cited

U.S. PATENT DOCUMENTS

| | | | |
|---|---|---|---|
| 4,573,761 A | 3/1986 | McLachlan et al. | |
| 5,112,127 A | 5/1992 | Carrabba et al. | |
| 5,402,508 A | 3/1995 | O'Rourke et al. | |
| 5,774,610 A | 6/1998 | O'Rourke et al. | |
| 5,911,017 A | 6/1999 | Wach et al. | |
| 6,028,666 A | 2/2000 | Boss et al. | |
| 6,208,783 B1 | 3/2001 | Wach | |
| 6,222,970 B1 | 4/2001 | Wach et al. | |
| 6,737,649 B2 | 5/2004 | Webster | |
| 7,499,153 B2 | 3/2009 | Puppels et al. | |
| 7,647,092 B2 * | 1/2010 | Motz et al. | 600/478 |
| 2003/0191398 A1 | 10/2003 | Motz et al. | |
| 2004/0073120 A1 | 4/2004 | Motz et al. | |
| 2011/0135244 A1 * | 6/2011 | Marple | 385/12 |

* cited by examiner

*Primary Examiner* — Rhonda Peace
(74) *Attorney, Agent, or Firm* — McHale & Slavin, P.A.

(57) ABSTRACT

A fiber optic probe assembly which incorporate a series of graduated shaped and nestable members, e.g. cylindrical annular members which enable uniform and repetitive construction and assembly of the probes resulting in a high degree of quality control.

10 Claims, 11 Drawing Sheets

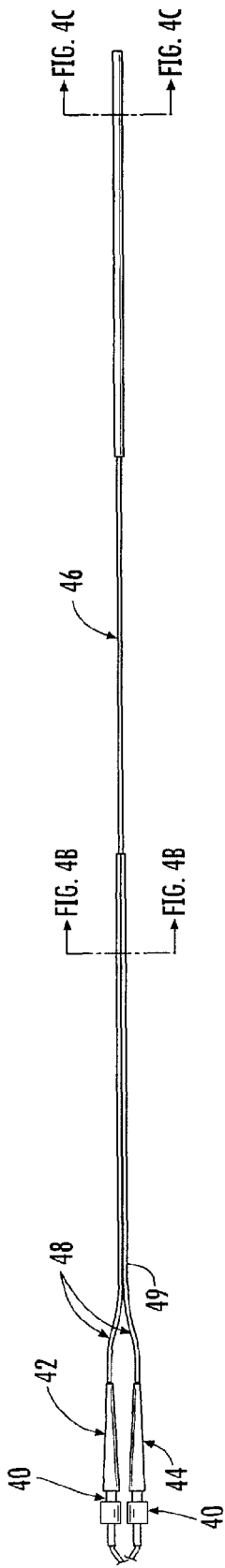
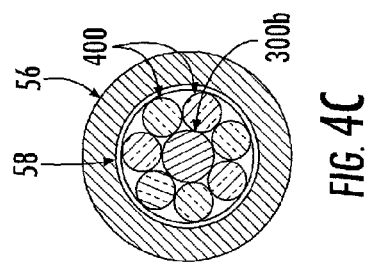
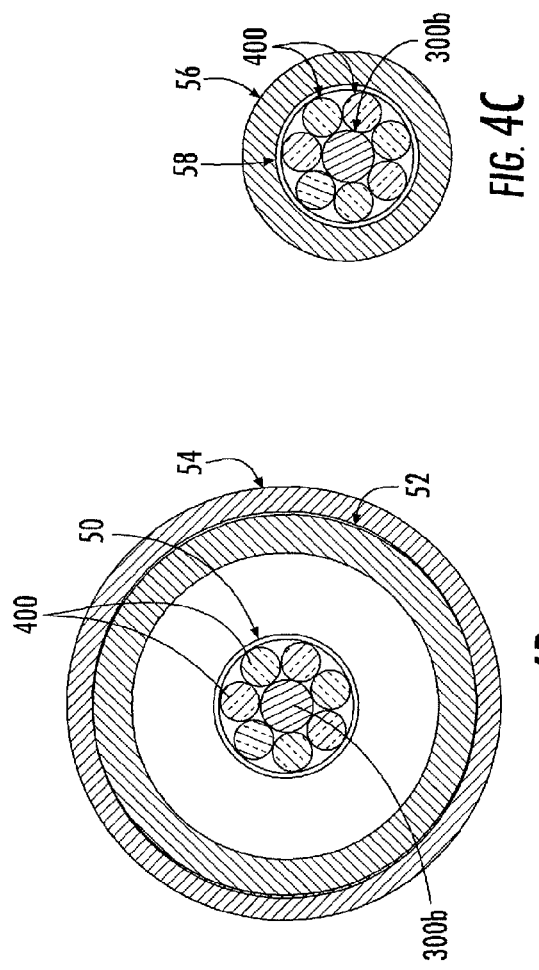
FIG. 4A
FIG. 4B
FIG. 4C

FILTERED FIBER OPTIC PROBE

FIELD OF THE INVENTION

This invention relates to the design and construction of filtered fiber optic Raman probes, particularly to fiber optic probes which are designed about a series of graduated cylindrical annular members which enable uniform and repetitive construction and assembly which results in a high degree of quality control.

BACKGROUND OF THE INVENTION

Light-scattering spectroscopy entails illumination of a substance and analyzing light that is scattered at angles relative to the incident source. The photon-matter interactions of the scattering events may be either elastic or inelastic. In an inelastic event, a photon's energy (wavelength) changes as a result of the light-matter interaction. In an elastic event, a photon's energy (wavelength) does not change. Absorption, the phenomena in which a fraction of photons are entirely absorbed, also plays a role in light-scattering spectroscopies.

Raman, diffuse reflectance, and fluorescence spectroscopies are of particular interest as they relate to vibrational and nonvibrational photonic responses of a material. The Raman effect describes a subtle light-matter interaction. Minute fractions of light illuminating a substance are Raman-scattered in random directions. Raman-scattered light is color shifted from the incident beam (usually a laser). The color frequency shifts are highly specific as they relate to molecular bond vibrations inducing molecular polarizability changes. Raman spectroscopy is a powerful technique for chemical analysis and monitoring. Analysis of the resulting low light levels require sophisticated, expensive instrumentation and technical complexity.

Specular reflectance relates to a surface's mirror-like aspects. Diffuse reflectance relates to light that is elastically scattered from the surface of a material at diffuse angles relative to the incident beam. For example, a projector screen diffusely reflects light while a glossy, newly waxed car has a high specular component. Diffuse reflectance spectroscopy is important for chemical analysis as well as measuring visual perception.

Fluorescence relates to substances which absorb light at one wavelength then re-emit it at a longer wavelength as a result of electronic transitions. As an example, a "highlighter" felt-tip marker appears to "glow" green as it absorbs blue and ultraviolet light then emits it as green. Fluorescence provides a powerful technique for chemical monitoring.

Raman spectroscopy involves energizing a sample with a high-power, narrow-wavelength energy source, such as a laser. The laser photons induce low intensity light emissions as wavelengths shift. The Raman effect is an inelastic scattering of photons. The emitted Raman light is collected and analyzed with a specialized instrument.

The spectral positions (colors) of the shifts provide fingerprints of the chemicals in the sample. Thus, Raman spectroscopy provides a means for chemical identification. The intensity of the shift (the spectral peak height) correlates to chemical concentration. Thus, a properly calibrated instrument provides chemical content and concentration. In practicality, Raman spectroscopy is technically complex and requires sophisticated, expensive instrumentation.

The basic concept for a probe-based, on-line Raman instrument is simple. Laser light is directed down an optical fiber to a remote probe. The laser light exits the fiber and illuminates the sample medium. Another fiber picks up the Raman-emitted light and returns it to the instrument for analysis.

Optical aspects of probe engineering have historically required particular design finesse. The Raman effect involves very weak signals. Raman emissions may be one trillionth as intense as the exciting radiation. Subsequently, the probe must be incredibly efficient in collecting and transmitting Raman-emitted light. Furthermore, the signal must not be corrupted by extraneous influences.

In order to make a filtered probe of the style depicted (not using expanded beam optics), typically each fiber is filtered individually. As disclosed in my previous U.S. Pat. No. 6,222,970, this is generally accomplished by depositing a filter on the fiber end face and butting this filter to another fiber using a tube or coupler to join/align the two fibers. Subsequently, the filtered collection fibers and filtered excitation fiber are epoxied together and placed inside a larger tube, epoxied in place, and then polished so the end face is an optical finish. Alternatively, this can also be accomplished by placing the filter on a glass (fused silica) substrate, machining it to a small circle and placing it between the fibers, as taught in U.S. Pat. No. 5,774,610, and completing as described above.

Since the filters are positioned back from the tip itself this necessitates that the rigid section of the probe be long which limits its usefulness for many applications (such as endoscopic applications), and the complexity of the probe manufacturing process is high, since the more collection fibers used the more time is required to make each filtered fiber. The diameter also becomes larger since each fiber needs a connecting tube, so the size grows with each filtered fiber. If smaller fibers are used they become even more difficult to handle and construct if attempting to make a very small diameter probe. If the filter is deposited on the end face of the fibers and the filter is at the end of the probe the filter can be scratched easily, and aligning all the filtered fibers so the end is smooth and uniform is very difficult and time consuming, because one cannot polish the end since the filters would be removed.

PRIOR ART

U.S. Pat. No. 5,402,508 to O'Rourke, et al teaches a fiber optic probe having fibers with endfaces formed for improved coupling efficiency and a method of using same. A fiber optic probe is taught for detecting scattered light, with transmitting and receiving fibers having slanted ends and bundled together to form a bevel within the tip of the probe. The probe comprises a housing with a transparent window across its tip for protecting the transmitting and receiving fibers held therein. The endfaces of the fibers are slanted, by cutting, polishing and the like, so that they lie in a plane that is not perpendicular to the longitudinal axis of the respective fiber. The fibers are held in the tip of the probe using an epoxy and oriented so that lines normal to the slanted endfaces are divergent with respect to one another. The epoxy, which is positioned substantially between the transmitting and receiving fibers, is tapered so that the transmitting fiber, the epoxy and the receiving fiber form a bevel of not more than 20 degrees. The angled fiber endfaces cause directing of the light cones toward each other, resulting in improved light coupling efficiency. A light absorber, such as carbon black, is contained in the epoxy to reduce crosstalk between the transmitting and receiving fibers.

U.S. Pat. No. 5,112,127 to Carrabba, et al. teaches a fiber-optic probe which is useful for measuring Raman spectra of samples remote from the light source and detector. The probe head contains optical components which selectively remove unwanted fluorescence and Raman scattering arising from the interaction between the Raman excitation source radiation and the input optical fiber. The optics also filter the Raman excitation source into a return optical fiber leading to a spectrometer or detector. In one embodiment, the disposition of optical components provides a compact probe geometry with parallel input and output fibers at one end and a sampling port at the other end. An encasement for the optics is also disclosed, for sealing the components against the environment, and for coupling the probe to specialized sampling attachments, such as for conducting Surface Enhanced Raman Spectroscopy.

U.S. Pat. No. 6,208,783 to Wach, is directed toward an optical filtering device for filtering light propagating within waveguides, including optical fibers. The device includes an optical filter, a first waveguide section and a second waveguide section positioned between the filter and the first waveguide section. The diameter of the second waveguide section is greater on the end proximate to the optical filter than on the end opposite the optical filter, typically tapering from one end of the second waveguide section to the other. The benefits of this device include reduction of power density, collimation of light for filtering and/or facilitation of optical coupling, and robustness.

U.S. Pat. No. 6,737,649 to Webster is directed toward a fiber optic probe, designed to be inserted into a particulate sample, which is formed from distal ends of transmitting and receiving optic fibers. The distal ends of the transmitting fibers are located centrally in the probe and the distal ends of the receiving fibers are formed in a ring around the distal ends of the transmitting fibers. The distal ends of the receiving fibers arc set back from the distal ends of the transmitting fibers. The receiving fibers carrying diffusely scattered light reflected from and transmitted through the particulate sample to a spectrophotometer housing containing fixed grating and an array of silicon photodetectors arranged to detect the spectrum dispersed by the grating in the range of 500 to 1100 nm.

U.S. Pat. No. 7,499,153 to Puppels discloses a fiber optic probe, wherein the fiber optic probe comprises one or more optical fibers for directing laser light onto the tissue and for collecting light that is scattered by the tissue and guiding the collected light away from the tissue towards the signal detection unit, wherein the fiber or fibers for collecting light have substantially no Raman signal in one or more parts of the 2500-3700 $cm^{-1}$ spectral region, and wherein the detection unit records the Raman signal scattered by the tissue in said spectral region. This type of probe with no filtering and using a single fiber is generally only useful for the high wavenumber region of Raman spectroscopy (which is not as specific as the fingerprint region of Raman spectroscopy), since the silica raman produced by the fiber itself will, in most cases, tend to dominate the fingerprint region, thereby reducing its usefulness. The invention enables ex vivo, in vitro and in vivo analysis and diagnosis of atherosclerotic plaque and detection of tumor tissue with great advantages over current state-of-the-art technology.

The prior art fails to teach or suggest a Raman probe as illustrated by the present invention, nor a process for assembly thereof.

SUMMARY OF THE INVENTION

In accordance with the present invention a Raman optical probe is produced by preparing an assembly which comprises a central tube surrounded by the collection fibers, which assembly is formed by use of epoxy or the like and polished. This readily enables the use of any size fiber, since problems with fiber alignment, which for years have plagued most methods of probe manufacture, are not an issue with this design. Even in the case where the fibers are of a very small diameter, the ultimate epoxied assembly is larger and therefore easier to work with. The center excitation fiber, positioned within a needle tube (typically a nitinol tubing that may be center less ground) can be inserted inside this main tube. A band pass filter is thinned to a thickness which allows the use of a small diameter excitation fiber. As the laser beam expands after it exits the fiber end face it travels through the filter substrate, preferably a fused silica, and if the thickness of the filter is chosen properly the beam will be the same diameter as the band pass filter has been machined to. The nitinol tube provides an excellent laser shield, so crosstalk of reflected laser light off the surface of the band pass filter substrate is stopped before it can make it to the collection fibers or long pass filter. In addition, having some type of needle tube, illustrated by, but not limited to a nitinol needle tube around the excitation fiber insures that if the band pass filter has any chipping or cracks on the outside edges of the filter from the machining process, these flaws will be over the needle tube and not over the fiber. These imperfections would affect the filter performance if they were above the excitation fiber and the probe would not perform as well as it could. Alternatively, this problem could be addressed by use of a fiber with a wide cladding, so the chipping would be over the cladding.

The main tube also helps in that a donut filter is formed so as to lay directly on top of this, so if the filter has any chipping or cracks on the edge of the center hole of the donut filter from machining, these imperfections will be above the tube not above the collection fibers. These imperfections would affect the filter performance if above the collection fibers and the probe would not perform optimally.

Normally, one would want the collection fibers to be as close to the excitation fiber as possible. Any gap between the fibers will normally reduce the performance of the probe. This is true for probes in which the fibers end faces stop at the same position (a standard old designed probe), but in the instantly disclosed design, the collection fibers are recessed back from the end face of the excitation assembly. This allows the collection beam of the collection fiber to expand through the donut filter, and this collection cone can collect Raman scattered light directly from the side of the excitation assembly. This construction enables an individual collection fiber to collect a similar amount of Raman light as compared to more conventional designs, even though it is not in intimate contact with the excitation assembly. This configuration also enables the use of a greater number of collection fibers surrounding the excitation. The thickness of the donut filter can be chosen and machined to whatever thickness is best for the particular diameter of the main tube, and thereby maximize the performance of the probe.

This design also facilitates the use of very small collection fibers. This is very important since the fibers entering the spectrograph must be stacked one on top of each other into a line, and the width of this line affects the resolution of the spectrograph. Normally a fixed slit of 50 or 100 microns is placed at the entrance of the spectrograph to control this. If the fibers are large in relation to this slit, say a 300 micron core, the majority of the light collected is wasted or thrown away since it never really enters the spectrograph. The instantly disclosed design allows easy use of these small fibers since they are epoxied together around the main tube and handled as one assembly which the filter is placed upon. Utilizing small fibers also has advantages in flexibility, and smaller bend radii which enables usefulness in more applications such as endoscopic and catheter based measurements. Prior art designs required the technician to handle each fiber alone which is tremendously difficult and time consuming, and the ability to keep each fiber clean prior to assembly is problematic. Since every design will utilize a greater number of small diameter fibers than large diameter fibers, this has historically been a large problem in prior art designs.

Accordingly, it is a primary objective of the instant invention to provide fiber optic probes which incorporate a series of graduated shaped and nestable members, e.g. cylindrical annular members which enable uniform and repetitive construction and assembly of the probes resulting in a high degree of quality control.

It is a further objective of the invention to provide an alternative construction wherein the collection fibers follow a shaped machined tip which enables the user to collect a signal from very close to the excitation laser or delivery element.

It is yet an additional objective to provide an alternative embodiment which uses one or more lenses or other optical devices to alter the way the light is collected or altered.

It is a still further objective to provide a process for fiber optic assembly which provides a series of graduated shaped and nestable members, e.g. cylindrical annular members to insure uniform and repetitive alignment and fiber positioning, thereby substantially eliminating misalignment and resulting in a high degree of quality control.

Other objects and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

BRIEF DESCRIPTION OF THE FIGURES

FIG. 4A illustrates a perspective view of a complete fiber optic probe;

FIG. 4B is a cross-sectional view of the fiber optic probe taken through section line B-B;

FIG. 4C is a cross-sectional view of the fiber optic probe taken through section line A-A;

DETAILED DESCRIPTION OF THE INVENTION

Figure 1A:
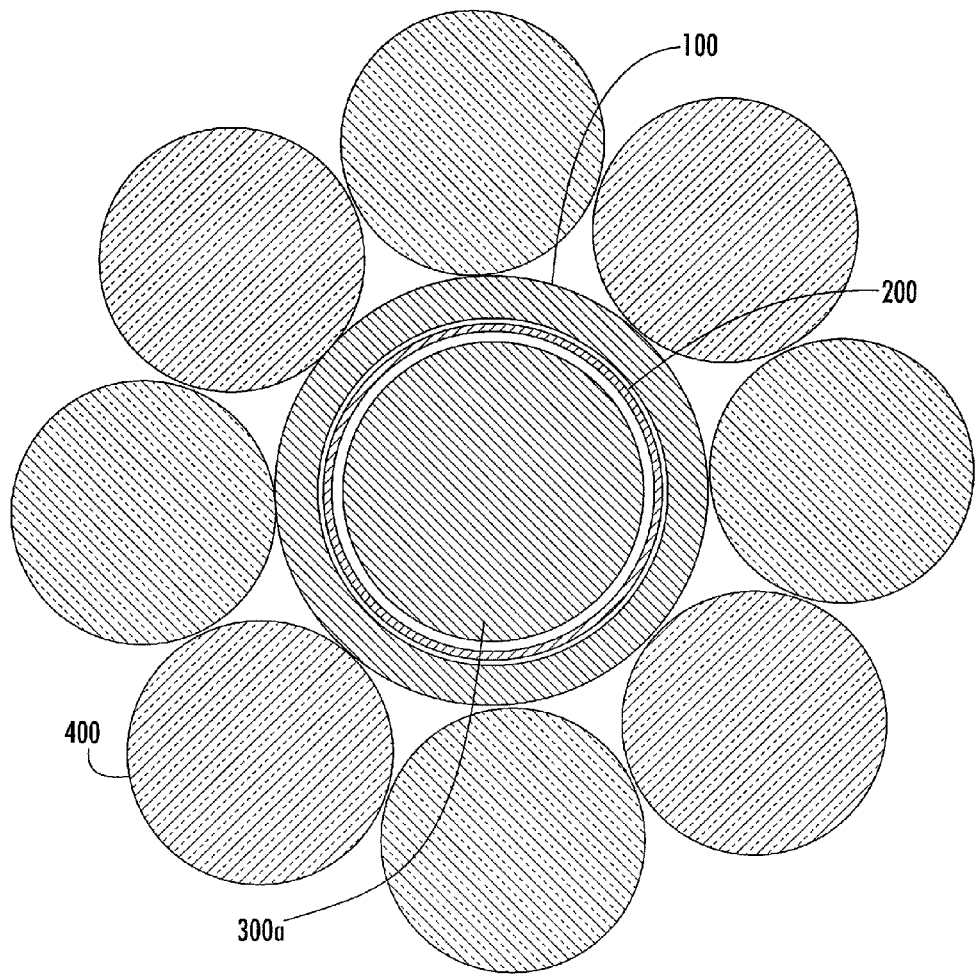
FIGS. 1A and 1B illustrate an end-view of a 9 around 1 design and a 30 around 1 design, respectively.

In accordance with the present invention, the term optical element(s) or collection element(s) is understood to include optical fibers, per se, along with assemblies which include various combinations of optical fibers, filters and lenses.

While the present invention is illustrated utilizing cylindrical tubes, fibers, and the like, it is nevertheless contemplated by this invention that the tubes, fibers, filters and the like could have other than a circular cross-section, e.g. they could be shaped in the form of a square, rectangle, or other polygonal shape, such that they are "nestable", meaning that they are capable of being assembled in equivalent nesting arrangements, defining annular "ring-like" spaces, albeit not necessarily round in cross-section.

In one embodiment of the instant invention a fiber optic probe assembly, useful in Raman spectroscopy, is described which comprises at least one excitation optical fiber, having a proximal end and a distal end, for transmitting light from a light source at the proximal end to a sample surface at the distal end. A plurality of collection optical fibers, each having a proximal end and a distal end, is also provided wherein the collection optical fibers are generally distributed circumferentially about the at least one excitation optical fiber, whereby the collection fibers are adapted to receive collected Raman scattered light from the surface, a first cylindrical annular member is provided having a proximal end and a distal end, an inner diameter and an outer diameter, wherein the inner diameter is sized and configured to receive therein the at least one excitation optical fiber, a band pass filter is provided having a proximal surface and a distal surface, wherein the excitation optical fiber distal end and the band pass filter proximal surface are in juxtaposed relationship, and a second cylindrical annular member is provided having a proximal end and a distal end, an inner diameter and an outer diameter, wherein the second cylindrical annular member inner diameter is sized and configured for receipt within the first cylindrical annular member outer diameter and the band pass filter, and a third cylindrical annular member is provided having a proximal end and a distal end, an inner diameter and an outer diameter, wherein the third cylindrical annular member is sized and configured to receive therein the second cylindrical annual member such that the third cylindrical annular member inner diameter is in juxtaposed and nesting relationship with the second cylindrical annular member outer diameter. In this configuration, the plurality of collection optical fibers are circumferentially distributed about and affixed to the outer diameter of the third cylindrical annular member. By "affixed to the outer diameter" is understood to mean affixed either directly or indirectly. For example in the 7 around 1 or 9 around 1 embodiments the fibers are directly affixed to the third cylindrical annular member, however in the 30 around 1 embodiment, some of the fibers are affixed to each other and are only indirectly affixed to the third cylindrical annular member. An annular long pass filter having a proximal surface and a distal surface, an inner diameter and an outer diameter is further provided wherein the annular long pass filter inner diameter is sized and configured for receipt about the second cylindrical annular member outer diameter and wherein the proximal surface of the long pass filter is in juxtaposed relationship with the distal ends of the plurality of collection optical fibers.

The following detailed description will refer to the associated figures.

Figure 1B:
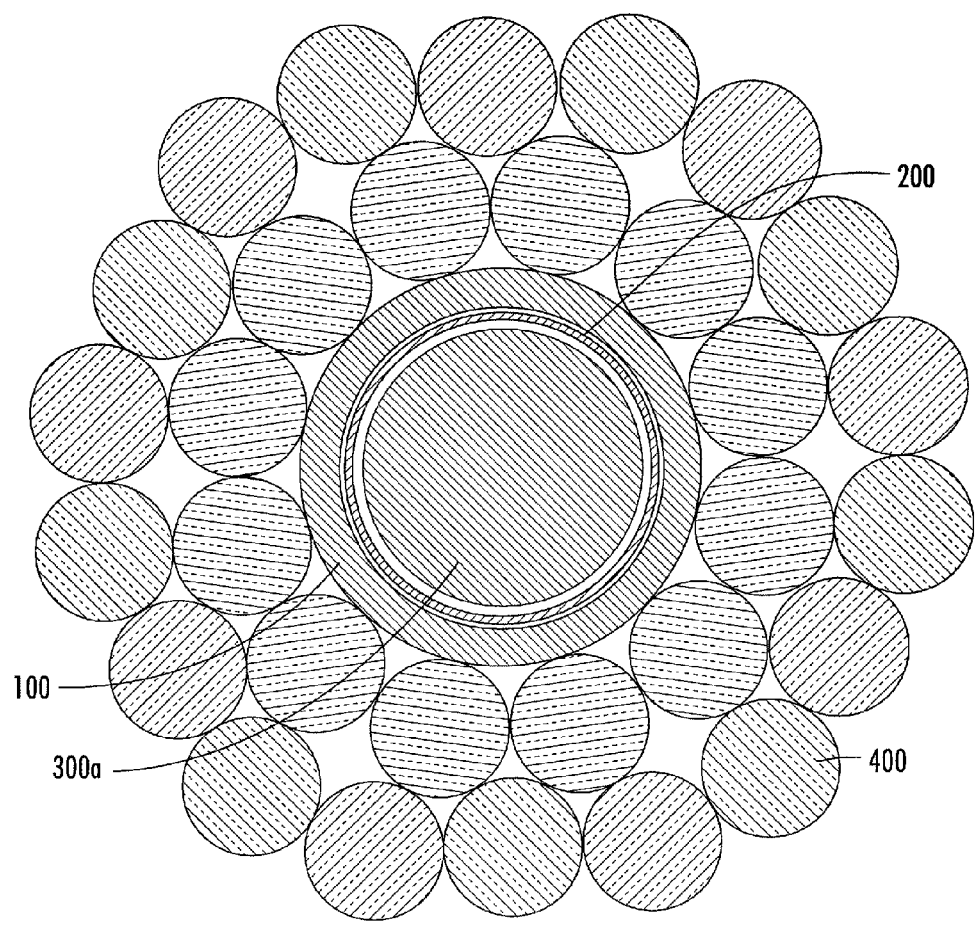

Referring to FIGS. 1A and 1B, end views of a 9 around 1 design and a 30 around 1 design, respectively, are illustrated. Utilizing low OH silica clad silica core optical fibers (Polymicro Technologies), one will first cut nine 300 micron core collection fibers 400 to a desired length for the probe. Next, the technician will remove the polyimide buffer, approximately ½ inch from end of the fiber, by any of the means suggested by Polymicro Technologies. The technician will then cut 23 ga extra thin wall stainless steel needle tube 100 to approximately ¾ inch in length. Next, the technician will place a small drop of epoxy on one end of needle tube and cure. One will then cut 24 ga Teflon heat shrink tubing to approximately 1.5 inches long and place the 9 fibers with polyimide removed inside the Teflon heat shrink. The technician will then place a 23 ga extra thin wall needle tube 100 in the middle of the 9 fibers, making sure that epoxy on the end is at the outside and even with the ends of the fibers. At this juncture care should be taken to insure that about ½ inch of heat shrink is sticking past the ends of the fibers/tube. The technician will then heat shrink the Teflon to pull all the fibers in intimate contact with the needle tube. Using a syringe epoxy is then injected inside the Teflon tubing and covers the fibers/tube. Care must be taken to not inject epoxy so that it goes beyond the end of the needle tube (so the tube end remains open). Next, is the step of curing the epoxy and removing the Teflon. The end of the fiber tube assembly can now be polished to a good quality optical finish, e.g. approximately a 1 micron polish film. Care should also be taken to be certain that the tube has been polished through the small drop of epoxy that was cured on the end initially (so the tube is open on both ends). Pushing a wire through the tube will insure it is open and clean.

Figure 2A:
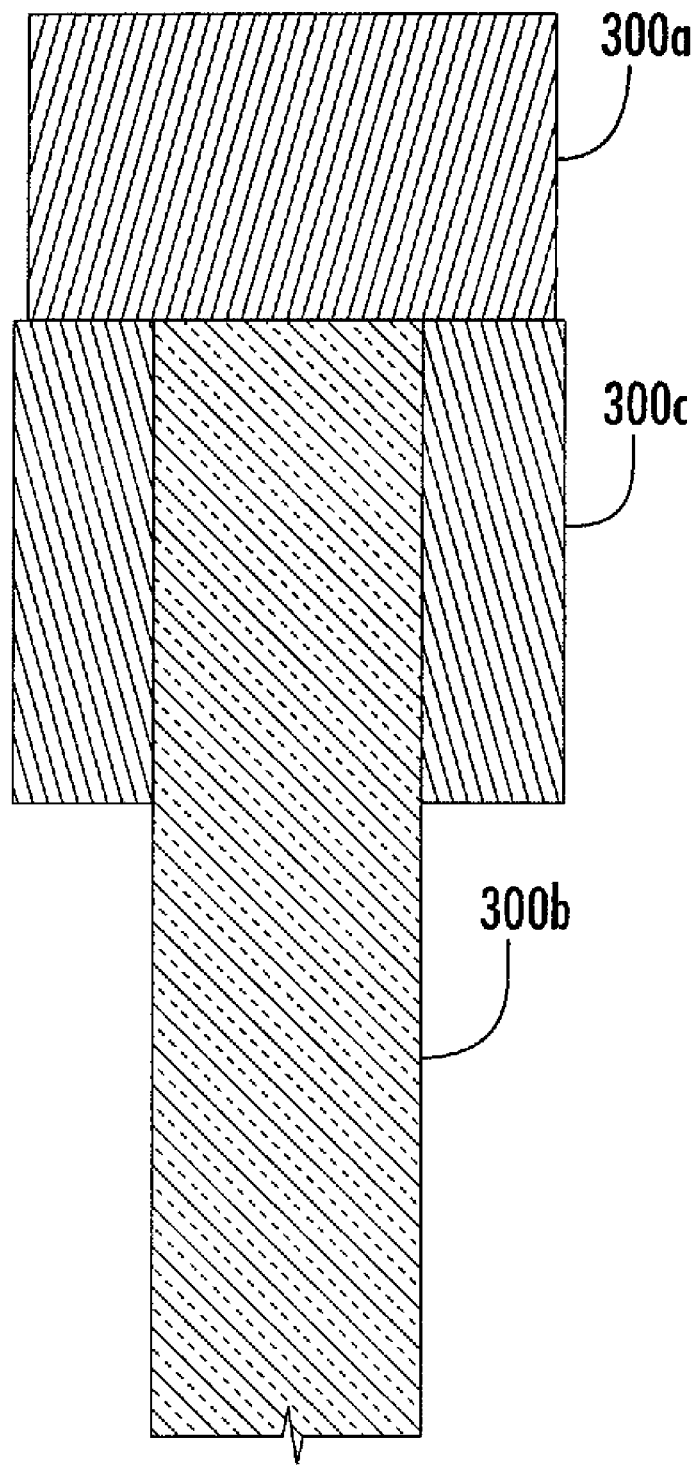
FIG. 2A illustrates a cross-sectional view of the excitation optical element sub-assembly.
Figure 2B:
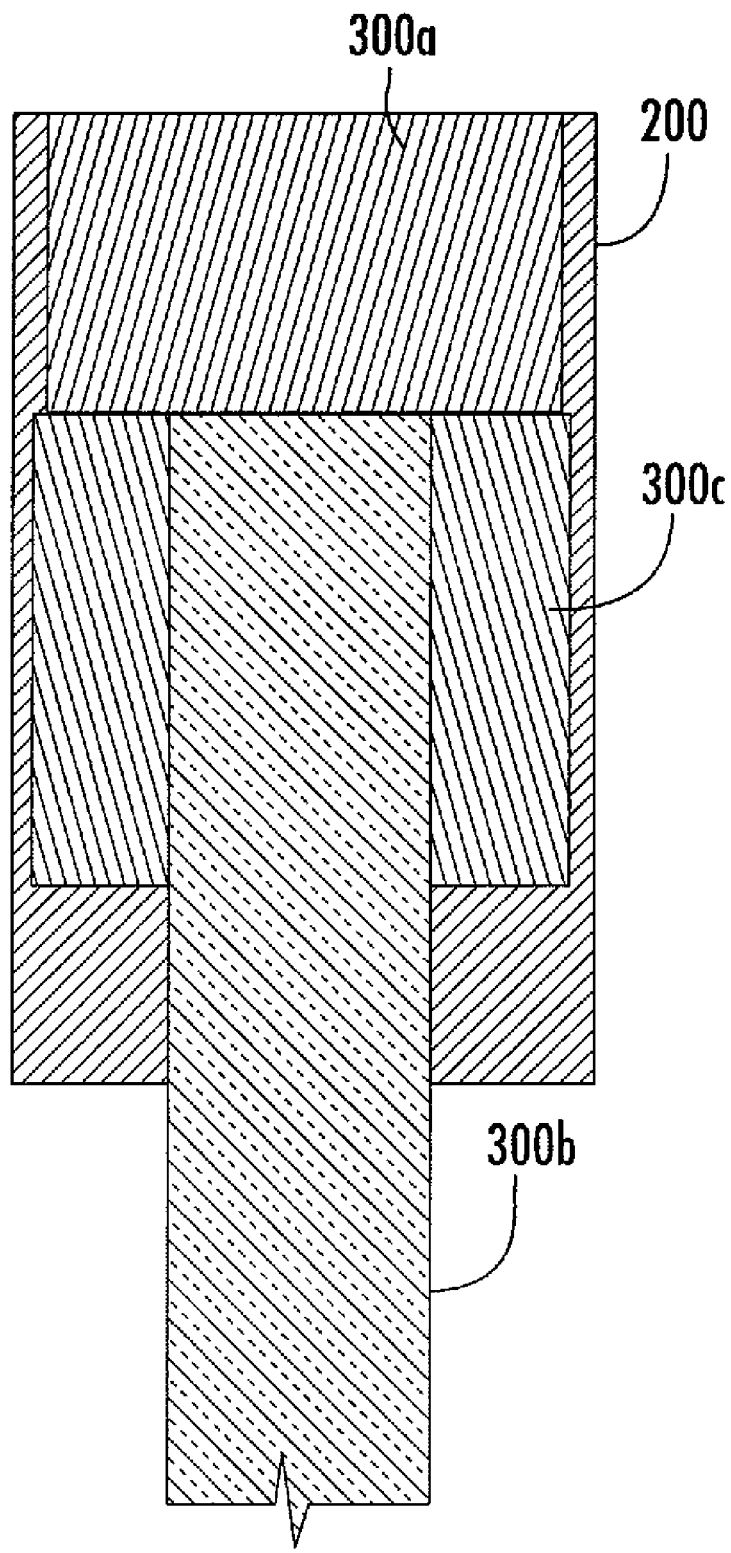
FIG. 2B is a cross-sectional view which further illustrates the excitation optical element sub-assembly positioned within the centerless ground nitinol tube.

Now referring to FIG. 2A, a cross-sectional view of the excitation optical fiber sub-assembly is illustrated, wherein the filtered laser fiber is made by first cutting a 200 micron core fiber 300B with the polyimide buffer (Polymicro Technologies) to the desired probe length. The fiber has about ¼ inch of the polyimide buffer removed. The fiber is epoxied into a 26 ga regular wall needle tube 300C cut to about ⅜ inch long. This needle tube with fiber inside is polished with a bare fiber adaptor. This polished fiber has an individual cleaned Band Pass filter 300A machined to a diameter of 0.018 inches placed on the end (filter side down, typically 200 to 400 microns thick) with an optical epoxy and cured. As illustrated in FIG. 2B the nitinol tube 200 that was center less ground to the dimensions 0.0185 inch ID, 0.0195 inch OD is cut to about ⅜ inch long and placed over the excitation optical fiber sub assembly with epoxy. The filter should be close to flush with the end of the nitinol tube, and the epoxy is cured. This filtered fiber assembly can be polished if desired to make sure the filter substrate and nitinol tube are flush.

Figure 2C:
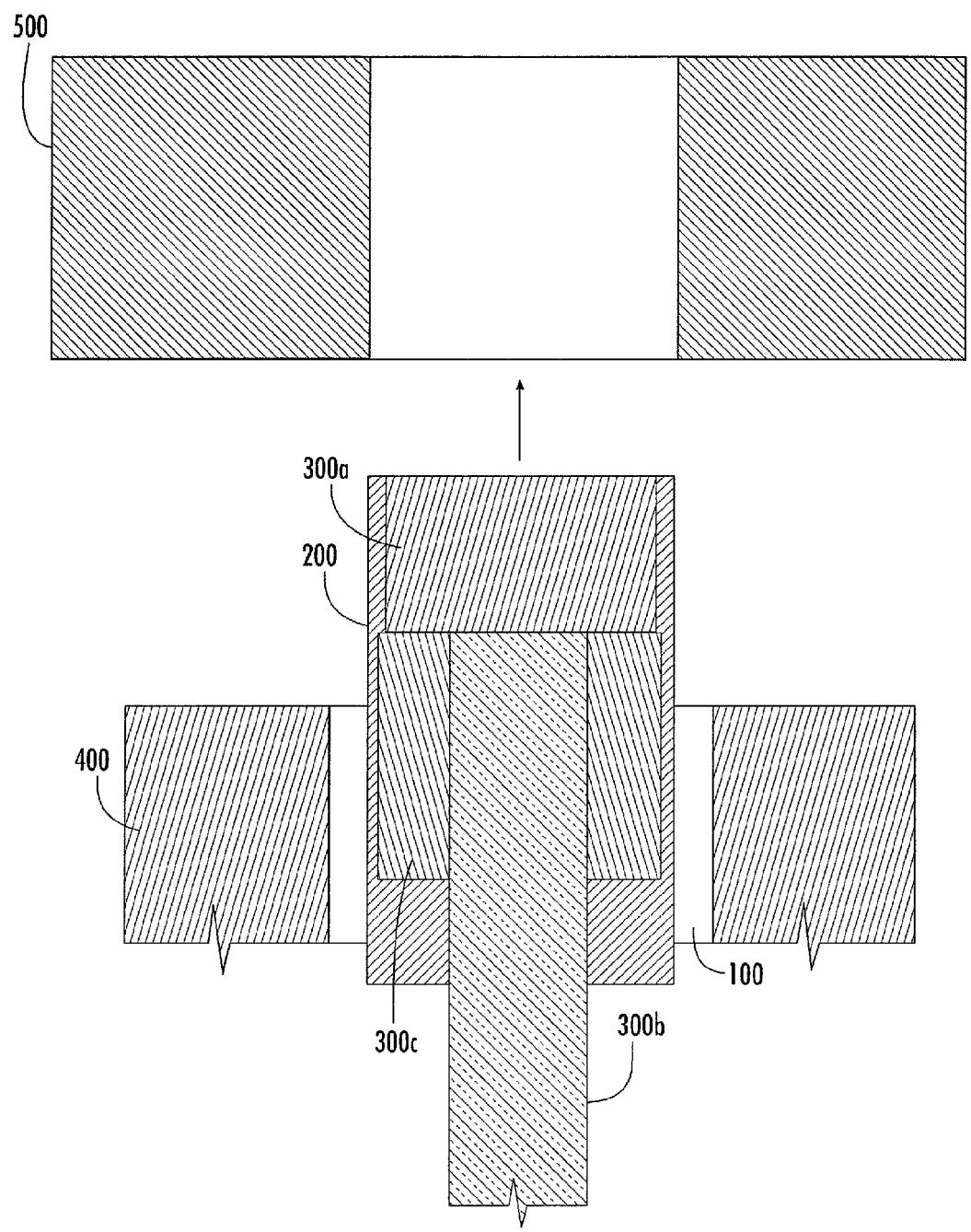
FIG. 2C is a cross-sectional view which further illustrates positioning of the long pass filter about the construction of FIG. 2B and illustrates positioning of the collection elements about a stainless steel tube.

With reference to FIG. 2C, the filtered fiber assembly is now placed inside the main tube 100 of the collection fiber assembly with optical epoxy.

Figure 2D:
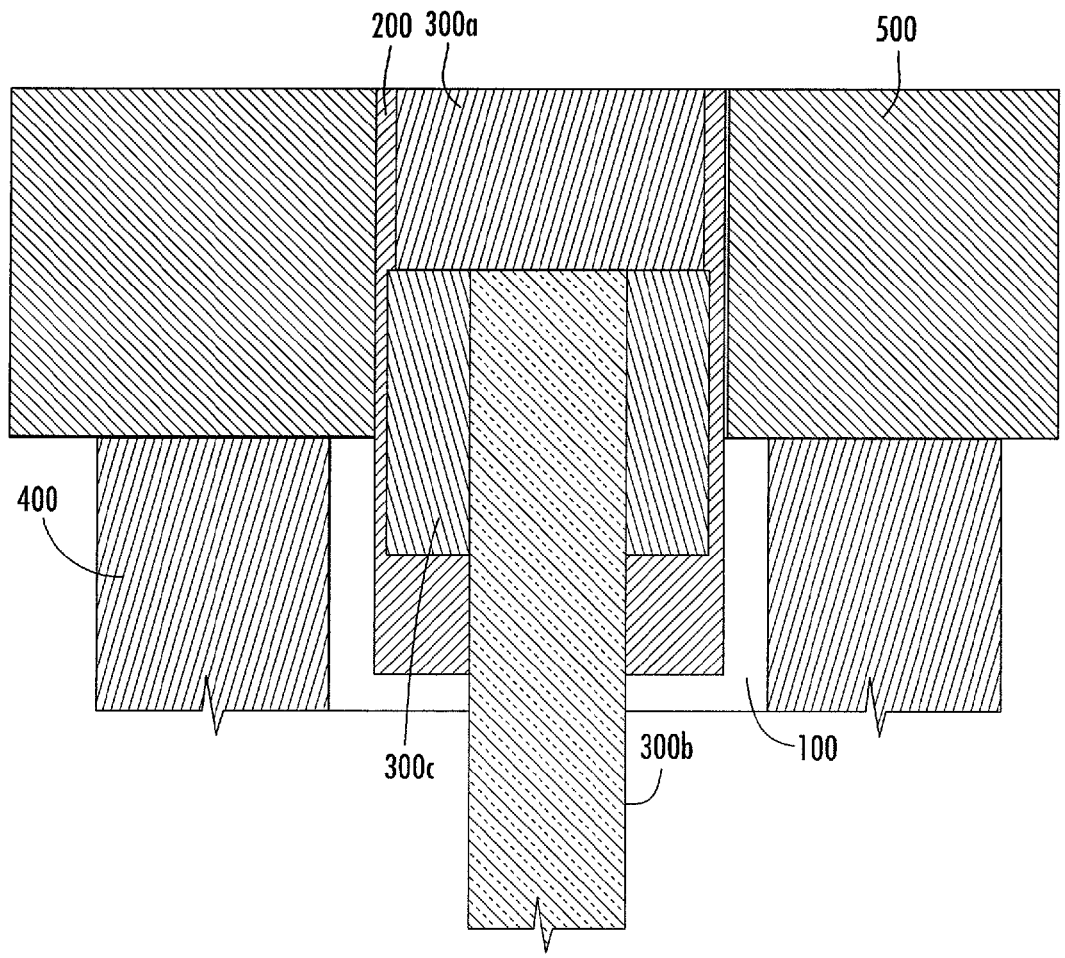
FIG. 2D is a cross-sectional view which illustrates final assembled positions of long and band pass filters in cooperation with excitation optical element sub-assembly and collection element sub-assembly.

As illustrated in FIG. 2D, the donut filter 500 machined with a 0.02 inch OD of the inner circle, 0.06 inch OD of the whole filter (filter side down, typically 250 microns to 500 microns thick) is now placed over this filtered fiber assembly. The filtered fiber assembly makes the donut go in the exact position desired. The optical epoxy will flow in between the donut (long pass filter) and the polished main tube and collection fibers end face. It is important to try to maintain the excitation filtered fiber assembly as close to being flush as possible with the surface of the donut or long pass filter. This entire assembly is cured, and a 14 ga needle tube (not shown) with epoxy is placed over the entire assembly and cured. The probe end can now be polished to insure the end face of the probe is flat and uniform.

Figure 3A:
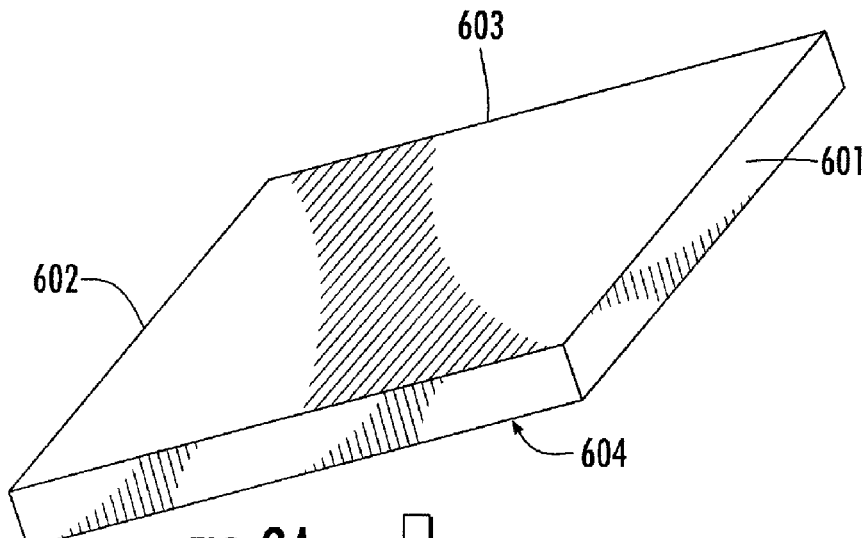
FIGS. 3A, 3B and 3C illustrate a stepwise procedure for filter manufacturing.
Figure 3B:
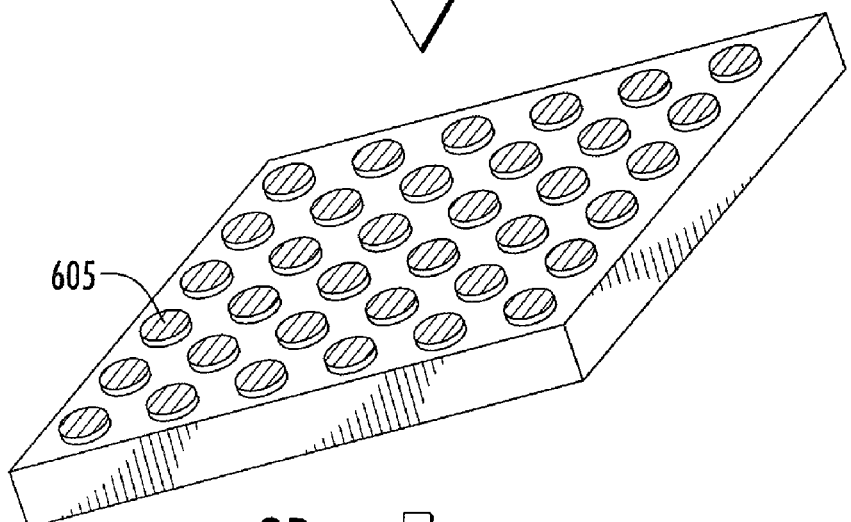
Figure 3C:
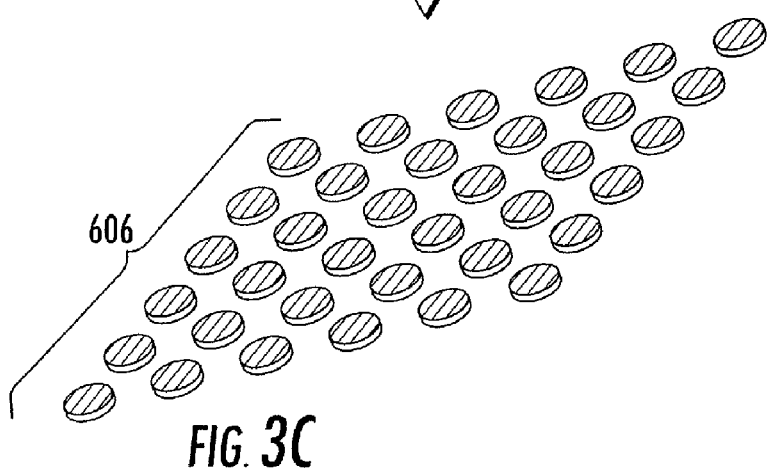

Referring now to FIGS. 3A-3C, an illustrative, albeit non-limiting example of a method of filter manufacture includes the steps of forming a filter coated substrate 604 by adhering a filter material 603 to a fused silica substrate 601 which is subsequently machined to have wells or cores 605 extending to a preselected depth through the filter and into the substrate. The shape of the wells defines the shape of the optical piece to be formed. In this illustration, circular band pass filters are formed, although the invention contemplates the utilization of any desired shape. The wells may, for example, be formed by machining of the substrate. Machining may be accomplished by standard methods such as the use of ceramic machining techniques, use of diamond tooling, and the like. It is further contemplated that laser machining under appropriate conditions could be used as well. Next, the machined filter is thinned by removing material from its back side (side opposite that having the well openings), for example, by polishing, to the level of the base of the machining wells, thereby releasing the multiple individual pieces 606. Multiple filters/coating types may also be formed. This methodology insures quality control of the filter run prior to machining. Both filters can be made using this methodology.

Now with reference to FIGS. 4A, 4B and 4C, an illustration of a complete fiber optic probe including the instantly disclosed construction is shown. FIG. 4A is a perspective view of a complete probe assembly, while FIGS. 4B and 4C are cross-sectional views taken along lines B-B and A-A respectively. Fiber connectors 40 are attached to both the excitation fiber 42 and collection fibers 44. A flexible polymer tubing 46 (many tubing types are suitable) can be placed over the bundle of fibers that come out from the back of the 14 ga needle tube 56 to protect the fibers. A breakout or "y" 49 is used to separate the excitation fiber from the collection fibers, and a pair of polymer tubes 48 are provided, one of which is placed over the excitation fiber, and the other of which is placed over the collection fibers. Standard or custom connectors 40 can be used to terminate the excitation fiber and collection fibers. All the polymer tubes and connectors are epoxied and cured. The terminations are then polished.

With reference to the cross-sectional views, FIG. 4B illustrates the excitation fiber 300B and collection fibers 400 covered or surrounded by a polymer tube 50, and surrounded by an 8 ga stainless steel tube 52 about which is a heat shrinkable tube 54. FIG. 4C more specifically illustrates the terminal end of the probe wherein a 14 ga tube 56 surrounds the excitation fiber 300B and collection fiber sub-assembly (here alternatively illustrated with seven collection fibers) 400, which is situated within 16 ga SS tube 58.

Figure 5A:
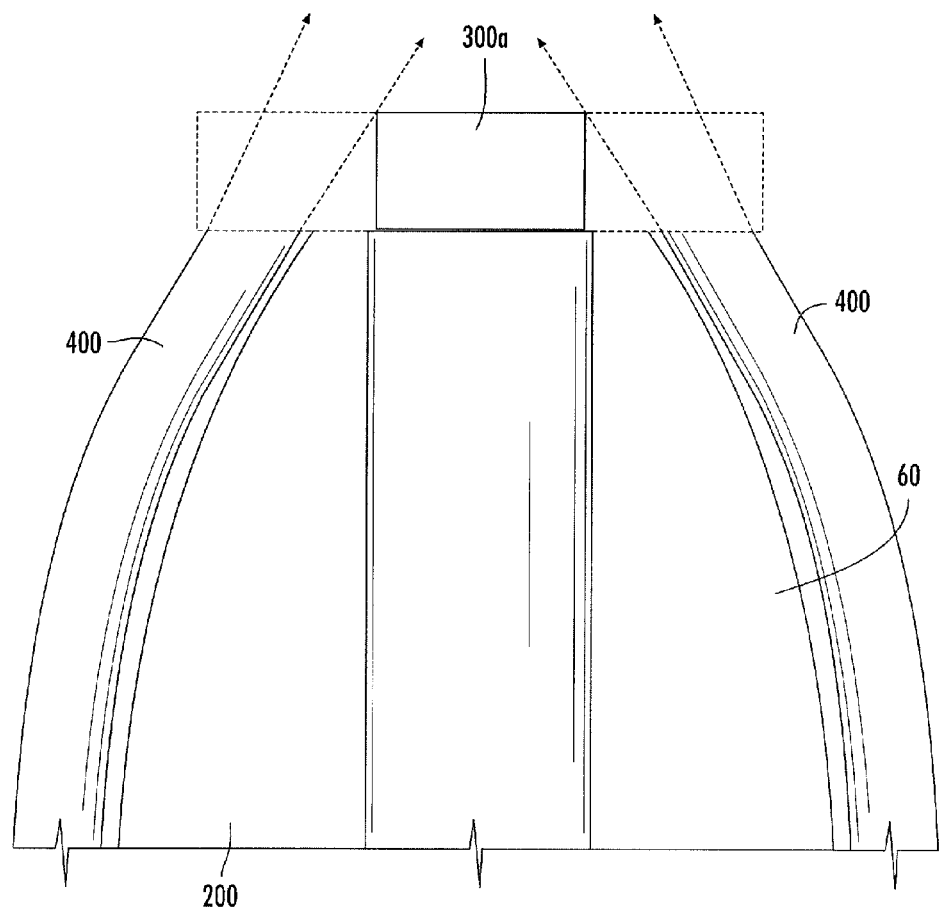
FIG. 5A illustrates a cross-sectional view of an alternative construction wherein the collection elements follow a shaped machined tip.

With reference to FIG. 5A, this embodiment illustrates a cross-sectional view of an alternative construction wherein the collection fibers 400 follow a shaped machined tip 60. In such an embodiment the machined tip could be a machined needle tube itself, so that the collection fibers collection region is different than the parallel fiber design. This embodiment enables the user to collect a signal from very close to the excitation laser or delivery fiber 300B.

Figure 5B:
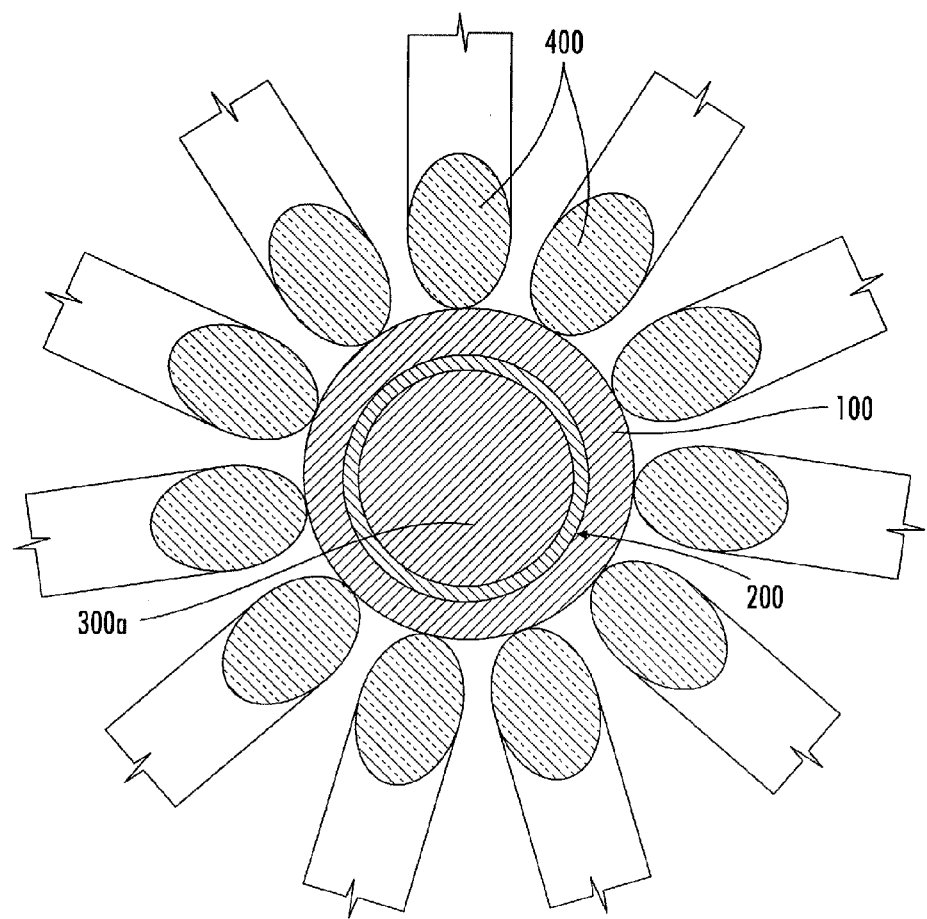
FIG. 5B is an end view of the device visualized in cross-section in FIG. 5A above. This view better illustrates the geometry of the end face of the collection fibers and aids in showing how they become ovoid in shape, since they follow the curvature which the machined tip follows.

Referring now to FIG. 5B, this is an end view of the device visualized in cross-section in FIG. 5A above. This view better illustrates the geometry of the end face of the collection fibers 400 and aids in showing how they become ovoid in shape, since they follow the curvature which the machined tip 60 follows.

Figure 5C:
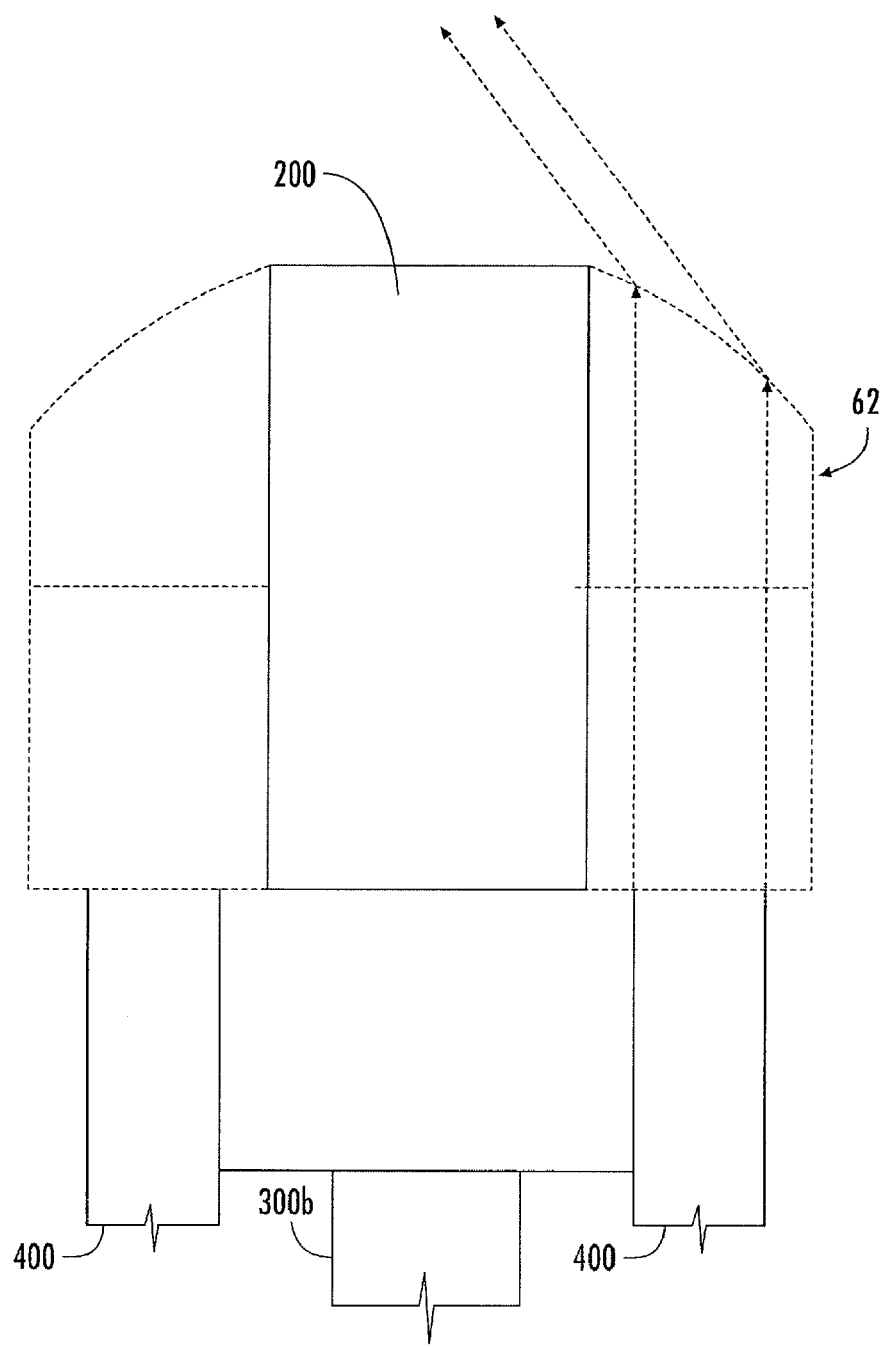
FIG. 5C represents an alternative embodiment which uses a lens or other optical device to alter the way the light is collected or altered.

With reference to FIG. 5C, this represents an alternative embodiment which uses a lens or other optical device 62 to alter the way the light is collected or altered. This could be any standard lens or a Grin (gradient index) Lens. There could also be more than one lens (a set of lenses). All of these designs incorporate a tube which allows for a fiber assembly to pass through. A top cover glass could also be added to the design if desired.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A fiber optic probe assembly, useful in spectroscopic analysis, comprising:
    at least one excitation optical element, having a proximal end and a distal end, for transmitting light from a light source at said proximal end to a sample surface at said distal end;
    one or more collection optical elements, each having a proximal end and a distal end, said collection optical elements distributed about the periphery of said at least one excitation optical element, whereby said collection elements are constructed and arranged to receive collected scattered light from said surface;
    at least one filter having a proximal surface and a distal surface, said excitation optical element distal end and said filter proximal surface being in juxtaposed relationship;
    a first annular member having a proximal end and a distal end, an inner dimension and an outer dimension, wherein said first annular member inner dimension is sized for receipt of said excitation optical element and filter;
    a second annular member having a proximal end and a distal end, an inner dimension and an outer dimension, wherein said second annular member is sized and configured to receive therein said first annular member such that said second annular member inner dimension surface is in juxtaposed and nesting relationship with said first cylindrical annular member outer dimension surface;
    said one or more collection optical elements peripherally distributed about and affixed to said outer dimension surface of said second annular member; and
    an annular filter having a proximal surface and a distal surface, an inner dimension and an outer dimension, wherein said annular filter inner dimension is sized and configured for receipt about said first annular member outer dimension and wherein said proximal surface of said annular filter is in juxtaposed relationship with said distal ends of said plurality of collection optical elements.

2. The fiber optic probe assembly of claim 1 useful for Raman spectroscopic analysis.

3. The fiber optic probe assembly of claim 1 useful for diffuse spectroscopic analysis.

4. The fiber optic probe assembly of claim 1 useful for reflectance spectroscopic analysis.

5. The fiber optic probe assembly of claim 1 useful for fluorescence spectroscopic analysis.

6. The fiber optic probe assembly in accordance with claim 1 wherein said at least one collection element is distributed circumferentially about said excitation element.

7. The fiber optic probe assembly in accordance with claim 1 wherein each said annular members is circular in cross-section.

8. The fiber optic probe assembly of claim 1, further including:
    a third annular member having a proximal end and a distal end, an inner dimension and an outer dimension, wherein said inner dimension is sized and configured to receive therein said at least one excitation optical fiber, and said outer dimension is sized and configured to allow for positioning said third annular member in nesting relationship within said first annular member.

9. The fiber optic probe assembly of claim 1, further including:
    at least one lens.

10. The fiber optic probe assembly in accordance with claim 1, wherein wherein each of said at least one collection elements follow a shaped tip.

* * * * *